(12) United States Patent
March et al.

(10) Patent No.: US 9,064,240 B2
(45) Date of Patent: Jun. 23, 2015

(54) APPLICATION BASED ON NODE TYPES ASSOCIATED WITH IMPLICIT BACKTRACKING

(75) Inventors: Verdi March, Singapore (SG); Yan Gu, Singapore (SG); Bu Sung Lee, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 13/457,614

(22) Filed: Apr. 27, 2012

(65) Prior Publication Data

US 2013/0290924 A1 Oct. 31, 2013

(51) Int. Cl.
*G06F 9/44* (2006.01)
*G06Q 10/10* (2012.01)
*G06Q 10/06* (2012.01)

(52) U.S. Cl.
CPC ............... *G06Q 10/103* (2013.01); *G06F 8/10* (2013.01); *G06F 8/34* (2013.01); *G06Q 10/06* (2013.01)

(58) Field of Classification Search
CPC ............... G06F 8/35; G06F 8/20; G06F 8/34; G06F 9/4443; G06F 8/38
See application file for complete search history.

(56) References Cited

U.S. PATENT DOCUMENTS

| | | | |
|---|---|---|---|
| 5,210,837 A * | 5/1993 | Wiecek | 717/104 |
| 6,314,555 B1 * | 11/2001 | Ndumu et al. | 717/101 |
| 2003/0004770 A1 * | 1/2003 | Miller et al. | 705/8 |
| 2003/0018697 A1 * | 1/2003 | Abraham et al. | 709/201 |
| 2004/0088678 A1 * | 5/2004 | Litoiu et al. | 717/104 |
| 2004/0153350 A1 * | 8/2004 | Kim et al. | 705/8 |
| 2005/0262470 A1 * | 11/2005 | Gavrilov | 717/100 |
| 2006/0004852 A1 * | 1/2006 | Abraham et al. | 707/103 X |
| 2007/0135936 A1 * | 6/2007 | Dumas et al. | 700/29 |
| 2008/0059945 A1 * | 3/2008 | Sauer et al. | 717/105 |
| 2008/0201688 A1 * | 8/2008 | Centonze et al. | 717/104 |
| 2008/0229276 A1 * | 9/2008 | Koehler et al. | 717/104 |
| 2009/0064053 A1 * | 3/2009 | Crawford et al. | 715/854 |
| 2009/0254912 A1 | 10/2009 | Roundtree et al. | |
| 2010/0174974 A1 | 7/2010 | Brisebois et al. | |
| 2010/0299763 A1 | 11/2010 | Marcus et al. | |
| 2011/0088010 A1 * | 4/2011 | Dangeville et al. | 717/104 |
| 2011/0106926 A1 | 5/2011 | McClain et al. | |
| 2011/0161391 A1 | 6/2011 | Araujo et al. | |

OTHER PUBLICATIONS

Krapp et al., Graph-Based Models for Managing Development Processes, Resources, and Products, 2000, pp. 455-474.*
Francisco Curbera et al., "Bite: Workflow Composition for the Web," Proc. of ICSOC 2007, Vienna, Austria, Sep. 2007, pp. 94-106, vol. 4749, Available at: <domino.research.ibm.com/comm/research_people.nsf/pages/rkhalaf.pubs.html/$FILE/bite.pdf>.

* cited by examiner

*Primary Examiner* — Lewis A Bullock, Jr.
*Assistant Examiner* — Tina Huynh
(74) *Attorney, Agent, or Firm* — Hewlett-Packard Patent Department

(57) ABSTRACT

Example embodiments disclosed herein relate to development of an application. An interface can be provided to develop an application using multiple nodes associated with a workflow model. The workflow model can include implicit backtracking based on node type.

16 Claims, 4 Drawing Sheets

APPLICATION BASED ON NODE TYPES ASSOCIATED WITH IMPLICIT BACKTRACKING

BACKGROUND

Consumers use various computing devices in their everyday lives. For example, consumers can use mobile devices, desktop devices, laptop devices, etc. These devices use applications to provide functionality to users. Application developers can use tools to develop these applications for users. For example, application developers can use software development kits to develop software for a device or set of devices. Many of these software development kits require a user to write code.

BRIEF DESCRIPTION OF THE DRAWINGS

The following detailed description references the drawings, wherein.

DETAILED DESCRIPTION

Figure 1:
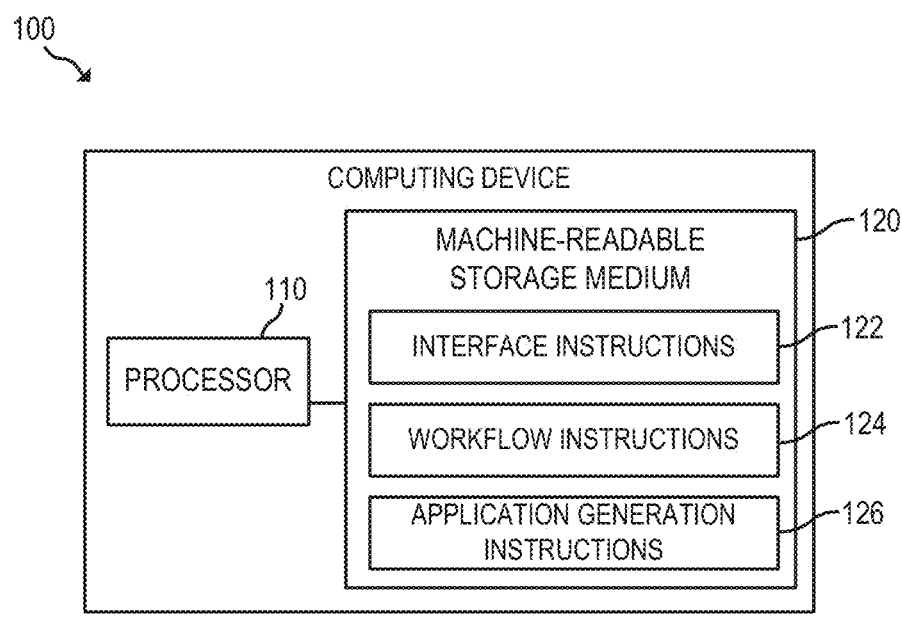
FIG. 1 is a block diagram of a computing device including software capable of providing an interface to develop an application with implicit backtracking based on node types, according to one example.

As noted above, applications are being developed for computing devices such as mobile devices, touch screen devices, etc. Applications for mobile devices have further led to the development of applications using interactions with a cloud system. As such, some applications can combine usage on a mobile device while also using features from cloud services. Adding usage of cloud services increase the challenges that come with designing and developing such applications by adding complexity to the software.

A workflow model can be used to simplify the design, configuration, customization, management, maintenance, etc. of applications regardless of whether the respective applications use cloud services. In certain examples, a workflow model enables an application designer to visually design an application by composing components in a graphical drag-and-drop interface. As such, in one embodiment, a workflow model is a software development kit that allows for development of applications using a drag-and-drop interface. The workflow model can implement rules directing how components interact with each other. Further, in certain examples, a component is considered a self-contained building block of an application. Examples of components include software libraries, web services, cloud services, business activities, etc. However, many current workflow models use low-level constructs. These low-level constructs may result in a convoluted workflow that may be difficult for a developer to understand and/or use without knowledge of an underlying associated programming language. In the example of mobile cloud applications, the convoluted workflow may be caused by a large amount of edges that would be tracked and accounted for between nodes of the resulting workflow.

Accordingly, various embodiments disclosed herein relate to providing a workflow model that supports implicit backtracking. The workflow may also support backtracking structure and/or interactive controls. In some embodiments, implicit backtracking is the provisioning of edges used for backtracking based on a type of node. In one example, during execution, going back to a node can mean to return from a node that is being executed to a previously executed node and re-executing the previously executed node. Further, in certain embodiments, a node is a component or set of components that can be used as building blocks for an application based on a workflow. Nodes can include an abstracted representation of a set of code, instructions, scripting, etc. that can be used to control the application. Each node can have a set of inputs and/or a set of outputs. Outputs from one node can be provided as inputs to the next node.

In certain examples, backtracking is the capability of moving backward in a flow of an application. In the example of a mobile device, such as a tablet or cellular device, the capability can be based on the press of a physical or virtual back button. Many mobile applications today include this capability to move back to another Graphical User Interface (GUI) state. The embodiments discussed herein facilitate the developer to be able to generate an application using the structured workflow without need to account for complicated edges and/or scripting. As such, node types can be defined as to whether the node type supports backtracking. When nodes are added to the flow of an application, node types that support implicit backtracking can be backtracked to while other node types are not backtracked to using the backtrack button. Rules of what nodes are backtracked and what nodes are cannot be backtracked can be combined with rules on inserting backward edges during compilation of an application based on a designed workflow.

FIG. 1 is a block diagram of a computing device including software capable of providing an interface to develop an application with implicit backtracking based on node types, according to one example. The computing device 100 includes, for example, a processor 110, and a machine-readable storage medium 120 including instructions 122, 124, 126 for developing an application with implicit backtracking based on node types. Computing device 100 may be, for example, a notebook computer, a workstation, a server, a desktop computer, a slate computing device, a mobile phone, or any other computing device.

Processor 110 may be, at least one central processing unit (CPU), at least one semiconductor-based microprocessor, at least one graphics processing unit (GPU), other hardware devices suitable for retrieval and execution of instructions stored in machine-readable storage medium 120, or combinations thereof. For example, the processor 110 may include multiple cores on a chip, include multiple cores across multiple chips, multiple cores across multiple devices (e.g., if the computing device 100 includes multiple node devices), or combinations thereof. Processor 110 may fetch, decode, and execute instructions 122, 124, 126 to generate an application using implicit backtracking based on node types, for example, to implement the tasks for FIG. 4. As an alternative or in addition to retrieving and executing instructions, processor 110 may include at least one integrated circuit (IC), other control logic, other electronic circuits, or combinations thereof that include a number of electronic components for performing the functionality of instructions 122, 124, 126.

Machine-readable storage medium 120 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), one or more storage drives, a Compact Disc Read Only Memory (CD-ROM), cloud storage, and the like. As such, the machine-readable storage medium can be non-transitory. As described in detail herein, machine-readable storage medium 120 may be encoded with a series of executable instructions for providing an interface to develop an application using nodes associated with a workflow model that supports implicit backtracking based on node types.

In one example, the interface instructions 122, the workflow instructions 124, and the application generation instructions 126 represent software that can be executed on the processor 110 to allow a user, such as a developer to develop one or more applications. The interface instructions 122 can be executed to provide an interface to develop the application using multiple nodes associated with a workflow model. Workflow instructions 124 can be executed to implement rules by which the nodes are constructed and/or used. The interface can be presented to a user via a presentation device, such as a monitor. Further, the interface may include input capabilities, where a user can provide input, for example, via a touch enabled interface, a mouse, a keyboard, etc.

In one example, the interface can include the ability to drag and drop nodes in a GUI. The interface can let a developer connect outputs of nodes to inputs of other nodes. As such, the user can control the flow of the application.

In one example, the workflow model includes implicit backtracking based on a node type associated with the nodes used in a particular application. A first type of node of the nodes that can be used includes implicit backtracking. As further detailed in FIG. 2A, this node can support implicit backtracking, where implicit backtracking means that a future node executed in the application can return to this node. As such, the node type can be a backtrackable node type. In certain embodiments, a backtrackable node type is a node that, when the application is compiled, is capable of being backtracked to by a node further in an execution flow of the application. In certain examples, execution flow is the sequence of nodes that are run during execution of the application.

Moreover, the backtracking can be a backable backtracking or a bookmarked backtracking. In one example, a backable backtracking can be considered moving back to the node from another node using a button, such as a back button. In another example, bookmarked backtracking can be considered choosing the node from a set of previous nodes traversed during execution of the application.

In certain scenarios, the backtracking node is further an interactive node. In one example, to be considered an interactive node, during execution of the application, the application can wait at a user interface state until input is received. In another example, the application can wait at a user interface state until input is received or another action occurs, for example, reception of input from another source, expiration of a timer, etc.

A second type of node of the nodes that can be used includes nodes that do not have implicit backtracking. These nodes can include non-backable interactive node types as well as logical states associated with logical nodes. In one example, a non-backable interactive node type is a node type that, when executed by a processor during execution of the application, provides interaction for a user via a GUI, but is not capable of being backtracked to. An example use of such a node type includes usage of a menu interface during execution of the application. Nodes can be customized for particular functionality and/or features.

In another example, a logic node type can be a non-backtrackable node type where a background process occurs. Examples of background processes include headless tasks on the device the application is executing on as well as cloud services that may be called by the application. One advantage of making these nodes not backtrackable is because the user would not be able to see a change in user interface when a back button is pressed. By making a rule that these types of nodes are non-backtrackable, the developer's tasks are simplified because the developer need not determine whether to assign a backwards edge to the respective nodes.

During execution of the interface instructions 122, the interface can receive selection information. In one example, the interface receives information about a first node. The selection information can specify a function of the node, a context of the node, combinations of thereof, etc. In one example, a function of the node can be described to a user via the interface (e.g., via an identifier, a description of the node, etc.). In another example, the context of the node can include information about one or more inputs and/or outputs of the node. As such, the context of the node can be considered the expected environment of the node during execution of the application. In one example, the first node is of a node type that includes implicit backtracking.

Once a first node is selected, a second node can be selected. As such, the processor 110 can receive second selection information via the interface. The second selection information can describe a second node. In certain examples, the second node can be of the second node type that does not include implicit backtracking. As with the first selection information, the second selection information can specify a function and/or a context of the second node. In one example, the selection information can include information about how inputs and/or outputs are connected between the second node and other nodes, for example the first node.

In some examples, other selection information can be used. For example, third, fourth, fifth, etc. selection information. In one example, third selection information is received. The third selection information can specify a context and/or function of a third node. The third node can be an interactive node. In one example, an interactive node is a node that, when executed during execution of the application, can receive information before performing an action. In one example, the flow of the application to be created can go from the first node to the second node to the third node. In certain examples, these connections can be direct. For example, the application can proceed from the first node to the second node to the third node. In other examples, these connections can be indirect. For example, the application can be configured to proceed from the first node to one or more other nodes to the second node to one or more other nodes to the third node. In this scenario, the other nodes can also be non-backtrackable nodes. As such, if a back command is received at the interface when the third node is running, the state of the application changes to the first node. In some examples, the first node can be executed from again from the start. In other examples, the first node can be initiated at a state before input was received.

In one example, the received selection information via the interface can be about the nodes. The selection information can specify a function of the one or more of the nodes, a context of one or more of the nodes, and a sequence among the nodes. In certain examples, the sequence is the order of execution of the nodes. The sequence can take into account branches based on options that can occur at a node.

The application generation instructions 126 can be executed to generate the application based on the selection of the nodes. For example, the application can be generated based on the first selection information, the second selection information, the third selection information, other selection information, etc. When the application is generated, backward edges can be entered between states where backward edges can be added. In certain examples, backward edges can be added between interactive nodes and the next backtrackable node before the interactive node.

In one example, the application can be executed to an interactive node. If a back command is received at this time, an execution state of the application can change to a closest preceding node of a backtrackable type to the interactive node. This can be accomplished by putting in a backward edge during compiling based on the sequence of nodes and node types of the nodes.

Figure 2A:
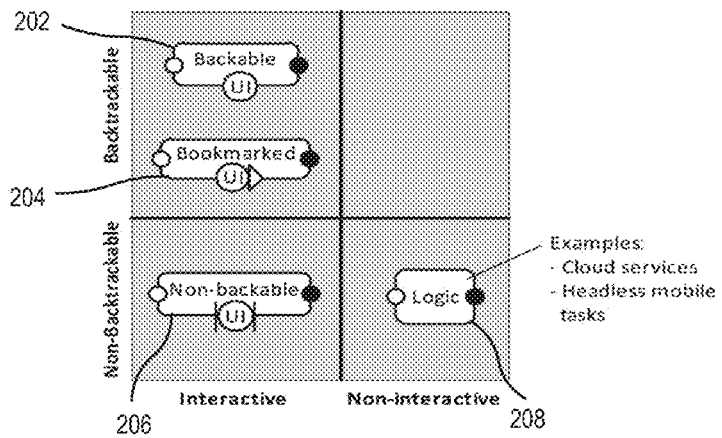
FIGS. 2A-2E are diagrams of node workflow uses, according to various examples.

FIGS. 2A-2E are diagrams of node workflow uses, according to various examples. FIG. 2A shows examples of node types. Node types can be broken down into two categories, backtrackable and not backtrackable. Further, these nodes can be interactive or non-interactive. Examples of backtrackable nodes are backable nodes 202 and bookmarked nodes 204. As such, these nodes can be sub-types of the backtrackable node type. Both types of nodes 202, 204 are interactive nodes. In these cases, nodes that are backtrackable are nodes that have associated GUIs. As such, when a user inputs a back button on a computing device executing an application made using the workflow, a GUI is shown. Further, bookmarked node 204 can further be associated with backtracking using a bookmarking feature. As such, a user of the application may bring up a selection tool on the user's device to show previous bookmarked nodes. Then, the user can select the bookmarked node. Users can choose to backtrack and/or use bookmarks when the user is in at an interactive node. In certain examples, both nodes 202, 204 are backtrackable, but bookmarked nodes can be a subset of the backable node 202 that also allows for bookmarking.

Non-backtrackable nodes such as interactive non-backable node 206 and non-interactive logic node 208 can be interactive or non-interactive. As such, the non-backtrackable node type can include a non-backable sub-type that is interactive and a logical sub-type that is not interactive. In certain examples, interactive non-backable node 206 can show a GUI during runtime, but is not backtrackable for one or more of various reasons. For example, the state may be chooser state that is non-backable and the equivalent of an exclusive or ("XOR") Boolean operator. In certain examples, the chooser can restrict a user to select exactly one and only one execution path out of many during runtime. This can preserve a critical-path structure. Logic node 208 is also not backtrackable and can be considered a processing state. The processing can occur on a device executing the application. An example of such a processing state is the performance of headless mobile tasks that may not have an associated GUI. The processing can also occur on another device, such as a cloud service. Examples of such processing states include when a node calls a function that is executed on the other device. In certain scenarios, some logic nodes can be associated with one or more functions that are called using the other device. Libraries of such functions can be used so the developer need not specifically know whether a logic node is processed at the device or the other device (e.g., using a cloud service).

Figure 2B:
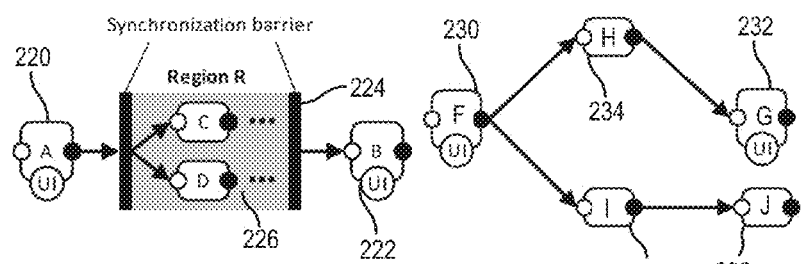
Figure 2C:
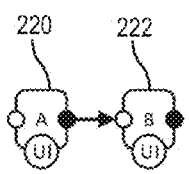

FIG. 2B shows examples of structured backtracking flow that can be created using a kit implementing workflow. Node A 220 can be directly connected to node B 222. As shown, both nodes represent backtrackable nodes. As such, during execution, if an application is at node B 222, pushing a back button can move the application back to state A.

In another embodiment, other nodes can be added between node A 220 and node B 222. These nodes can be within a synchronization barrier 224. In one example, a synchronization barrier 224 is used between interactive nodes to simplify the flow for developer use. The synchronization barrier 224 can represent a rule where each interactive node has at most one interactive successor. For example, the successor for node A 220 is node B 222. Logic nodes, such as nodes C and D, between consecutive interactive nodes are grouped in the region 226 of the synchronization barrier 224. The synchronization barrier 224 is imposed at the entrance and exit of each such region. By implementing such a rule in this example, time-travel paradoxes can be avoided. In one example, a time-travel paradox is where only a subset of a node's parents is re-executed. This can lead to a convoluted flow in the application. In this scenario, whether node C or node D or any other chain of nodes is performed, based on the output provided by node A 220, the end state leads to an output that can be used at node B 222.

In one example, a time-travel paradox can occur when the execution is backtracked from one node to another node, but only a subset of the node's parents is re-executed, for example, when there is no structure (e.g., when there is no synchronization barrier and/or critical path). Without the structure, a free directed graph can be created, such as the graph shown in FIG. 2C. Node F 230 can complete its execution. As such, nodes H 234 and I 236 start their execution. In this example, suppose that before node I 236 completes, node H 234 has already finished its execution and node G 232 starts to execute. The device executing node G 232 can receive a backtracking command from a user. Thus, the device execution is backtracked to node F 230. At this time, node I 236 can still be executing. Node F 230 can be re-executed at this time. At its completion, node H 234 and node I 236 should be re-executed. However, node I 236 may still be executing from the previous iteration. At this point, a time-travel paradox may occur at node I 236.

One approach to solving the paradox can be for node I 236 to cancel its execution from the previous iteration. Another strategy could include after node I 236 completes its execution from the previous iteration, node J 238 is executed. Then, node I 236 is re-executed again for the current iteration. This implies that later, node J 238 will also be re-executed. However, choosing between the strategies can be convoluted because the choice can be based on the context of the application, which means it would be based on a human decision. However, supporting this increases complexity. To simplify the model, the structured workflow (e.g., requiring a critical path, need to protect logic nodes in between interactive nodes, using synchronization barriers, etc.) can be enforced.

Figure 2D:
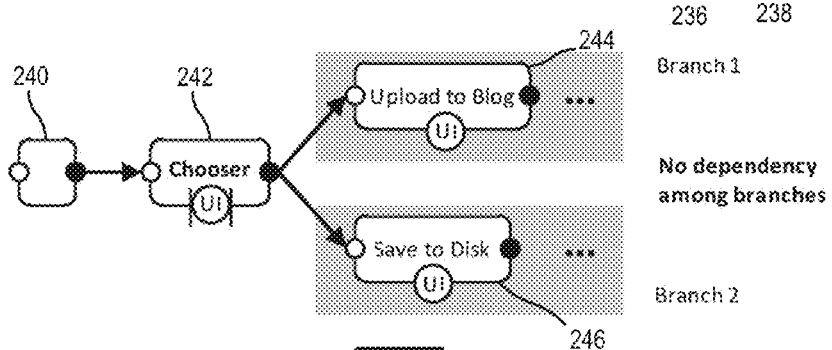

FIG. 2D shows an example of a chooser interactive control structure. As noted above, a chooser is a non-backable node type equivalent to an XOR Boolean operator. In this example, a first node 240 can lead to the chooser node 242. The chooser node 242 can include a user interface, but is not backtrackable. In the example of a camera application, the user can take a picture at the first node 240 and choose an operation to perform on the picture at the chooser node 242. For example, the user can choose to upload the picture to a blog or save the picture to disk. Here the two choices are distinct so there are no dependencies between the branches. As such, choosing to upload to a blog can lead to an upload node 244 while choosing save to disk can load to a saving node 246. In other scenarios, additional options can be presented. To keep the application simple for a developer, once the chooser selects one of the branches, the application can execute down that chain without being able to go back to the chooser. In other examples, the user may be able to go to a previous interactive state such as, for example, the state before the picture was taken, the state when the picture was taken, etc. An advantage of the chooser node is that it need not require workflow designers to specify in advance an if-else condition to facilitate automatic selection during execution of the application.

Figure 2E:
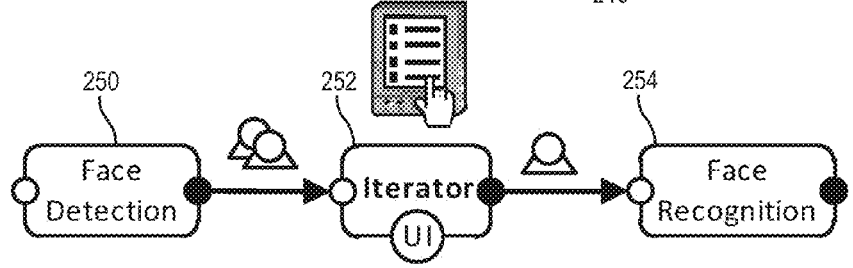

FIG. 2E shows an example of an iterator interactive control structure. In certain examples, an iterator is a backable node type that enables a collection of data items of the same type (e.g., media such as pictures or audio, lists, spreadsheets, etc.) to be processed by a node designed to process one item at a time. In the example of FIG. 2E, a face detection node 250 can operate on one or more images. The face detection can output a list of detected faces. The iterator node 252 can request users to select a particular face from the list. Then, the selected face can be forwarded to a face recognition node 254 that is designed to recognize one face at a time. The user can then hit a back button to go back to the list to be able to choose additional faces from the list. An advantage of the iterator node is that the iterator need not require workflow designers to define constructs resembling a loop such as a for-loop and/or a stop condition because the iteration can be manually triggered using user-initiated backtracking. Further, the combination of the chooser and iterator can obviate the need for a developer to spend time on scripting and scoping at design time.

Figure 3:
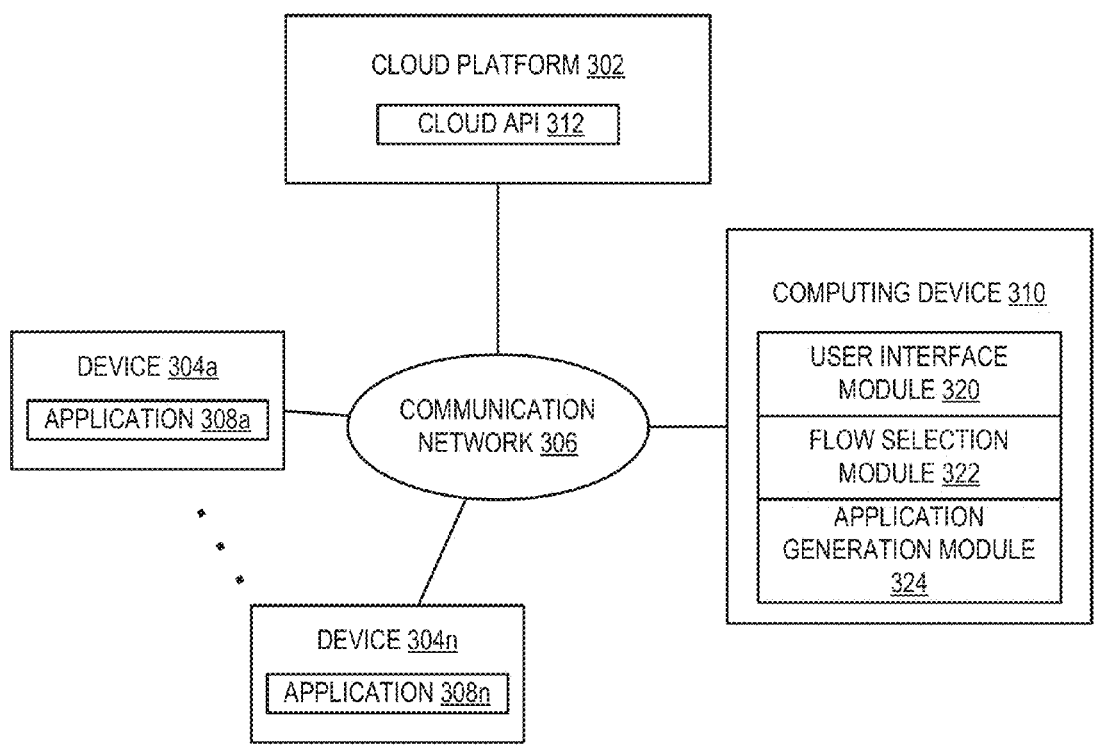
FIG. 3 is a block diagram of a system including example applications generated based on implicit backtracking based on node types, according to one example.

FIG. 3 is a block diagram of a system including example applications generated based on implicit backtracking based on node types, according to one example. The system 300 can include a cloud platform 302 that communicates with devices 304a-304n via a communication network 306. In some examples, the devices 304a-304n can include an application 308a-308n that may be generated using a computing device 310 using the workflow model described herein. The computing device 310 may also be attached to a communication network 306. The application 308 may use a cloud application programming interface (API) 312 from the cloud platform 302 via the communication network 306. In certain examples, the cloud platform 302, the devices 304a-304n, and/or computing device 310 are computing devices, such as servers, client computers, desktop computers, mobile computers, tablets, laptops, etc. The cloud platform 302, the devices 304, and/or the computing device 310 can be implemented via a processing element, memory, and/or other components.

As such, computing device 310 can be implemented using a processor (not shown) such as a CPU, GPU, or microprocessor suitable for retrieval and execution of instructions and/or electronic circuits configured to perform the functionality of any of the modules 320, 322, 324 described herein. As detailed herein, computing device 310 may include a series of modules 320, 322, 324 for using a workflow to generate applications 308, for example, by implementing the method of FIG. 4. Each of the modules 320, 322, 324 may include, for example, hardware devices including electronic circuitry for implementing the functionality described herein. In addition or as an alternative, each module may be implemented as a series of instructions encoded on a machine-readable storage medium and executable by a processor. It should be noted that, in some embodiments, some modules are implemented as hardware devices, while other modules are implemented as executable instructions.

User interface module 320 can be used to provide a user interface to develop an application using a plurality of nodes according to a workflow model. The workflow model can include implicit backtracking for one or more of the nodes associated with a first node type. The workflow model can also include a lack of backtracking for another one or more nodes associated with a second node type. A flow selection module 322 can also be provided via the user interface to select a structured flow of the nodes.

In one example, nodes can be provided via the interface for a user to choose from. The nodes can include zero, one, or more inputs and/or zero, one, or more outputs to communicate with other nodes. Other inputs and/or outputs can be provided, for example, to implement a user interface during the execution of the node. The selection of the nodes can occur using various interfaces, for example, by dragging and dropping nodes. Outputs from some nodes can be connected to inputs of other nodes that come later in the flow. As noted above, the nodes can each represent a set of information such as instructions to be executed by the application during runtime of the application. Further, the first node type can be interactive. For example, the first node type can include a GUI wait state. In certain examples, a GUI wait state is a state where a GUI is provided to a user and the node waits for a user to provide input before executing further. Moreover, the second node type can include a logical state. Examples of logical states are nodes where processing occurs without showing a GUI related to what is being processed. For example, when processing occurs at a cloud or execution of a headless mobile task. Multiple nodes can be selected and connected using the flow selection module 322.

Then, the application generation module 324 can generate the application based on the structured flow and the selected nodes. In certain examples, this can include compiling the application resulting in an application executable on one or more of the devices 304a-304n. While generating the application, the application generation module 324 can determine backward edges to the flow based on the node types and rules associated with the node types. In certain examples, parts of the application can be executed remote from the respective devices 304, for example, via the cloud platform 302 or other devices. In certain examples, some nodes can include functions that can use the cloud API 312. For example, some nodes can include libraries that use processing form the cloud platform 302. Further, multiple such cloud platforms can be used by a single application.

The communication network 306 can use wired communications, wireless communications, or combinations thereof. Further, the communication network 306 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 306 can be in the form of a direct network link between devices. Various communications structures and infrastructure can be utilized to implement the communication network(s).

By way of example, the cloud platform 302 and devices 304 communicate with each other and other components with access to the communication network 306 via a communication protocol or multiple protocols. A protocol can be a set of rules that defines how nodes of the communication network 306 interact with other nodes. Further, communications between network nodes can be implemented by exchanging discrete packets of data or sending messages. Packets can include header information associated with a protocol (e.g., information on the location of the network node(s) to contact) as well as payload information.

In one example, an application 308 runs on a device 304. The application 308 can be generated based on a workflow model that includes implicit backtracking for some nodes. Examples of devices 304 can include mobile phones, laptops, desktops, smart printers, smart scanners, etc. The application 308 can execute from node to node. Some of the nodes can call a cloud platform. Further, some of the nodes can be backtrackable while other nodes are not backtrackable as discussed above.

Figure 4:
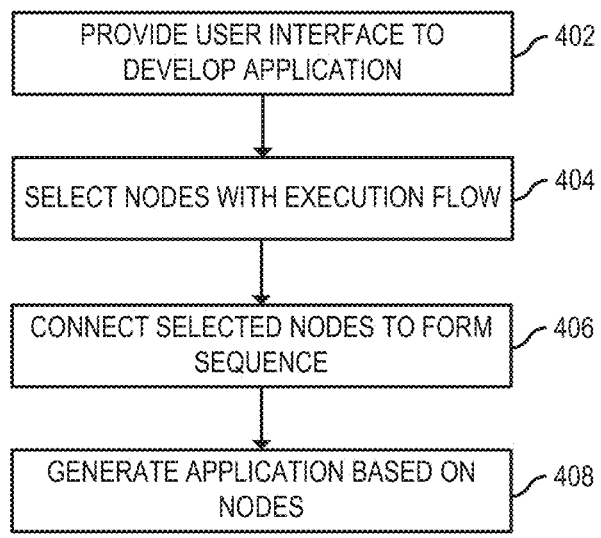
FIG. 4 is a flowchart of a method for generating an application based on nodes that may include implicit backtracking, according to one example.

FIG. 4 is a flowchart of a method for generating an application based on nodes that may include implicit backtracking, according to one example. Although execution of method 400 is described below with reference to computing device 310, other suitable components for execution of method 400 can be utilized (e.g., computing device 100). Additionally, the components for executing the method 400 may be spread among multiple devices. Method 400 may be implemented in the form of executable instructions stored on a machine-readable storage medium, such as storage medium 120, and/or in the form of electronic circuitry.

The user interface module 320 can provide a user interface to develop an application using multiple nodes according to a workflow model at 402. The user interface can be presented, for example, using an input/output of the computing device 310. For example, a GUI can be presented via a display associated with the computing device 310 and information can be received via a mouse, touch screen, keyboard, etc. associated with the computing device 310.

The workflow model can include implicit backtracking of one or more of the nodes associated with a first node type and no backtracking for other one or more nodes associated with a second node type. As such, in this scenario, the first node type can be backtrackable while the second node type is not backtrackable.

The user can provide user input to select nodes with a structured flow via a flow selection module 322. In certain examples, the selection can be via a drag and drop interface. At 404, the flow selection module 322 can select the nodes based on the user input. The user can drag nodes selected from a list to the application workspace. The nodes can further include input and/or output that can be customized by the user. For example, some nodes can be implemented to use a hardware device associated with the computing device, such as a camera, communications, sensors, etc. During the selection of the nodes, the user can associate inputs and/or outputs of nodes with other nodes. For example, one node may operate on an image input to generate a list of people based on facial recognition. This list can be outputted to another node that can perform a function on the list.

In one example, the user selects a first one of the available nodes. This first node can be associated with the backtrackable node type. The user can further select one or more second nodes that are associated with a non-backtrackable node type. Inputs and/or outputs can be connected. The user can also select a third node. The third node can be interactive and/or be associated with the backtrackable node type.

At 406, the selected nodes can be connected to form a sequence. In one example, the connections can occur by connecting one or more outputs of one node to one or more inputs of other nodes in the sequence. The execution flow of the nodes of the application to be generated can be performed from the first node to the second one or more nodes to the third node. Additional nodes can be selected as well. Further, in one example, the first node, second nodes, and third node can be directly connected or connected using a synchronization barrier. In one example, the structured flow of the application can be configured to be performed from the first node to one of the second nodes via one or more other nodes to one or more nodes to the third node when executed. As such, the execution flow of the application can be configured to be performed according to a sequence defined among the selected nodes.

In one example, if the application is executed to the third node and a back command is received the state of the application execution changes to the first node. In this example, the first node type can be an iterator node type while the second node type is a chooser node type or a logic node type.

In another example, the second node type is a logic node type. In this example, the second nodes can be separated from the first and third nodes via a synchronization barrier as previously detailed in FIG. 2B.

At 408, the application generation module 324 generates the application based on the nodes. In certain examples, the generation of the application can include compiling of the application. As noted above, the application generation module 324 can add in backward edges to the flow based on the node types and/or rules associated with the node types or other structures such as the synchronization barrier. For example, a structured flow can be imposed on the nodes. As such a set of one or more nodes can be logic nodes that are in-between two interactive nodes. The logic nodes can comprise a synchronization region as described in FIG. 2B. The synchronization region can be protected by an entry synchronization barrier and an exit synchronization barrier as shown in FIG. 2B. The entry synchronization barrier and the exit synchronization barrier can be used to impose the structured flow.

In one example, the application can be executed to an interactive node of the execution flow. If a back command is received, a state of the execution can change to a closest preceding node of the backtrackable node type to the interactive node. This can occur based on the implicit backtracking based on node type that is used to add backward edges.

With the above approaches, the development of applications for devices is simplified for developers. A developer work kit can be provided to allow a developer to generate an application or multiple applications using a workflow model that supports implicit backtracking. The developer work kit can further include functionality to save and/or load work flows. Because the work kit supports implicit backtracking, the developer need not worry about complications due to generating backwards edges between nodes. Instead, when the application is generated, backward edges can be generated based on workflow rules. Further, as the workflow model can support inherent constructs in structured backtracking, logic mistakes of developers can be reduced. Moreover, interactive control nodes such as the chooser and/or iterator nodes can be used in lieu of scripting by the developer. The interactive controls can be directed towards cases where the next node to be used is triggered by a determination of a user using the running application. As such, the application designer need not write specific filtering rules with programmatic expressions.

What is claimed is:

1. A non-transitory machine-readable storage medium storing instructions that, when executed by at least one processor of a device, cause the device to:
provide an interface to develop an application using a plurality of nodes associated with a workflow model,
receive, via the interface, selection information identifying the plurality of nodes, a node type for each of the plurality of nodes, and an execution flow including a sequence of the plurality of nodes that are run during execution of the application, wherein the node type for at least one of the plurality of nodes is a backtrackable node type that supports backtracking, and backtracking is a capability to move backwards in the sequence of the execution flow in response to user input received during execution of the application, and wherein the backtrackable node type includes a backable sub-type and a bookmarked sub-type, and backtracking for the backable sub-type includes moving backwards in the execution flow to a previously executed node using a button, and backtracking for the bookmarked sub-type includes selecting a previously executed node from a set of previously executed nodes in the execution flow to move backwards to the selected executed node in the execution flow.

2. The non-transitory machine-readable storage medium of claim 1, wherein the selection information specifies functions of the plurality of nodes and a context of the plurality of nodes, and the instructions further cause the device to generate the application based, at least in part, on the selection information.

3. The non-transitory machine-readable storage medium of claim 1, wherein the backtrackable node type is further an interactive node, wherein the interactive node causes the application to wait at a user interface state until an input is received.

4. The non-transitory machine-readable storage medium of claim 1, wherein the workflow model includes a non-backtrackable node type.

5. The non-transitory machine-readable storage medium of claim 4, wherein the non-backtrackable node type includes a non-backable sub-type that is interactive and a logic sub-type that is not interactive.

6. The non-transitory machine-readable storage medium of claim 1, wherein the execution flow follows the sequence of the plurality of nodes.

7. The non-transitory machine-readable storage medium of claim 6, wherein if the application is executed to an interactive node and a back command is received, an execution state changes to a closest preceding node that is the backtrackable node type to the interactive node.

8. The non-transitory machine-readable storage medium of claim 1, wherein the plurality of nodes each represent a set of instructions to be executed by the application.

9. The non-transitory machine-readable storage medium of claim 1, wherein the instructions are to determine the node type for each of the plurality of nodes, and if the node type for a node is the backtrackable node type, add a backward edge in the execution flow to the node.

10. A method comprising:
providing a user interface to develop an application using nodes according to a workflow model, wherein the workflow model includes implicit backtracking for at least one of the nodes associated with a backtrackable node type and no backtracking for at least another one of the nodes associated with a non-backtrackable node type;
selecting a first one or more of the nodes that is associated with the backtrackable node type;
selecting a second one or more of the nodes that is associated with the non-backtrackable node type;
connecting the selected nodes to form a sequence;
imposing a structured flow, wherein at least one of the second nodes are logic nodes and are in-between two interactive nodes of the nodes, wherein the logic nodes form a synchronization region, and the synchronization region is protected by an entry synchronization barrier and an exit synchronization barrier,
wherein an execution flow of the application is to be performed according to the sequence defined among the selected nodes, and wherein the backtrackable node type supports backtracking, and backtracking is a capability to move backwards in the sequence of the execution flow during execution of the application to a previously executed node in the sequence, and the non-backtrackable node type does not support backtracking; and
generating the application based on the nodes.

11. The method of claim 10, wherein if the application is executed to an interactive node and a back command is received, a state of the execution changes to a closest preceding node of the backtrackable node type to the interactive node.

12. The method of claim 10 wherein connecting the selected nodes comprises:
determining the node type for each of the plurality of nodes, and if the node type for a node is the backtrackable node type, adding a backward edge in the execution flow to the node.

13. A computing system comprising:
a processor; and
a non-transitory storage medium storing a set of instructions executable by the processor to cause the processor to:
a user interface module to provide a user interface to develop an application using a plurality of nodes according to a workflow model, and receive selection information identifying the plurality of nodes, a node type for each of the plurality of nodes, and an execution flow including a sequence of the plurality of nodes that are run during execution of the application,
wherein the node type for at least one of the plurality of nodes is a backtrackable node type that supports backtracking, and backtracking is a capability to move backwards in the sequence of the execution flow in response to a user input received during execution of the application, and wherein the backtrackable node type includes a backable sub-type and a bookmarked sub-type, and backtracking for the backable sub-type includes moving backwards in the execution flow to a previously executed node using a button, and backtracking for the bookmarked sub-type includes selecting a previously executed node from a set of previously executed nodes in the execution flow to move backwards to the selected executed node in the execution flow; and
generate the application based on the selection information.

14. The computing system of claim 13, wherein the backtrackable node type includes a graphical user interface wait state.

15. The computing system of claim 13, wherein the plurality of nodes each represent a set of instructions to be executed by the application.

16. The computing system of claim 13, wherein the executable set of instructions is to cause the processor to determine the node type for each of the plurality of nodes, and if the node type for a node is the backtrackable node type, add a backward edge in the execution flow to the node.

* * * * *

UNITED STATES PATENT AND TRADEMARK OFFICE
CERTIFICATE OF CORRECTION

Page 1 of 1

PATENT NO. : 9,064,240 B2
APPLICATION NO. : 13/457614
DATED : June 23, 2015
INVENTOR(S) : Verdi March et al.

It is certified that error appears in the above-identified patent and that said Letters Patent is hereby corrected as shown below:

In the claims

In column 12, line 29 approx., in Claim 13, delete "a user interface module to provide a user" and insert -- provide a user --, therefor.

Signed and Sealed this
Twenty-third Day of February, 2016

Michelle K. Lee
*Director of the United States Patent and Trademark Office*